United States Patent
Ishikawa et al.

(10) Patent No.: US 6,360,170 B1
(45) Date of Patent: Mar. 19, 2002

(54) REAR MONITORING SYSTEM

(75) Inventors: Naoto Ishikawa; Kazutomo Fujinami; Keiki Okamoto, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/511,500

(22) Filed: Feb. 23, 2000

(30) Foreign Application Priority Data

Mar. 12, 1999 (JP) .......................................... 11-066040

(51) Int. Cl.$^7$ ................................................ B60R 1/00
(52) U.S. Cl. ..................... 701/300; 701/301; 348/148; 340/903
(58) Field of Search ......................... 701/96, 300, 301; 342/455; 340/435, 436, 901, 903; 348/142, 148, 149

(56) References Cited

U.S. PATENT DOCUMENTS

| | | | |
|---|---|---|---|
| 4,970,653 A | 11/1990 | Kenue | 701/301 |
| 5,504,482 A | 4/1996 | Schreder | 340/988 |
| 5,517,412 A * | 5/1996 | Unoura | 701/300 |
| 5,521,633 A | 5/1996 | Nakajima et al. | 348/148 |
| 5,555,312 A * | 9/1996 | Shima et al. | 701/301 |
| 5,612,686 A | 3/1997 | Takono et al. | 340/903 |
| 5,621,645 A * | 4/1997 | Brady | 701/301 |
| 5,790,403 A * | 8/1998 | Nakayama | 701/301 |
| 6,005,492 A * | 12/1999 | Tamura et al. | 701/301 |
| 6,014,608 A * | 1/2000 | Seo | 701/301 |
| 6,038,496 A * | 3/2000 | Dobler et al. | 340/905 |
| 6,115,651 A * | 9/2000 | Cruz | 340/435 |
| 6,151,539 A * | 11/2000 | Bergholz et al. | 701/300 |
| 6,222,447 B1 * | 4/2001 | Schofield et al. | 348/148 |
| 6,226,592 B1 * | 5/2001 | Luckscheiter et al. | 701/301 |
| 6,246,961 B1 * | 6/2001 | Sasaki et al. | 701/301 |

FOREIGN PATENT DOCUMENTS

| | | |
|---|---|---|
| EP | 0 591 743 A1 | 4/1994 |
| EP | 0 736 414 A2 | 2/1996 |
| JP | 7-50769 | 2/1995 |

* cited by examiner

*Primary Examiner*—Gary Chin
(74) *Attorney, Agent, or Firm*—Armstrong, Westerman & Hattori, LLP

(57) ABSTRACT

In a rear monitoring system for a vehicle, the information on the road on which one's own vehicle has run is acquired. On the basis of the information thus acquired, the white lines on a rear road image which distinguish one's own lane from both adjacent lanes are estimated. Using the white lines thus estimated, it is decided whether another detected vehicle is located on one's own lane or adjacent lanes.

10 Claims, 9 Drawing Sheets

TIME t−3Δt          TIME t−2Δt          TIME t−Δt

TIME t+2Δt

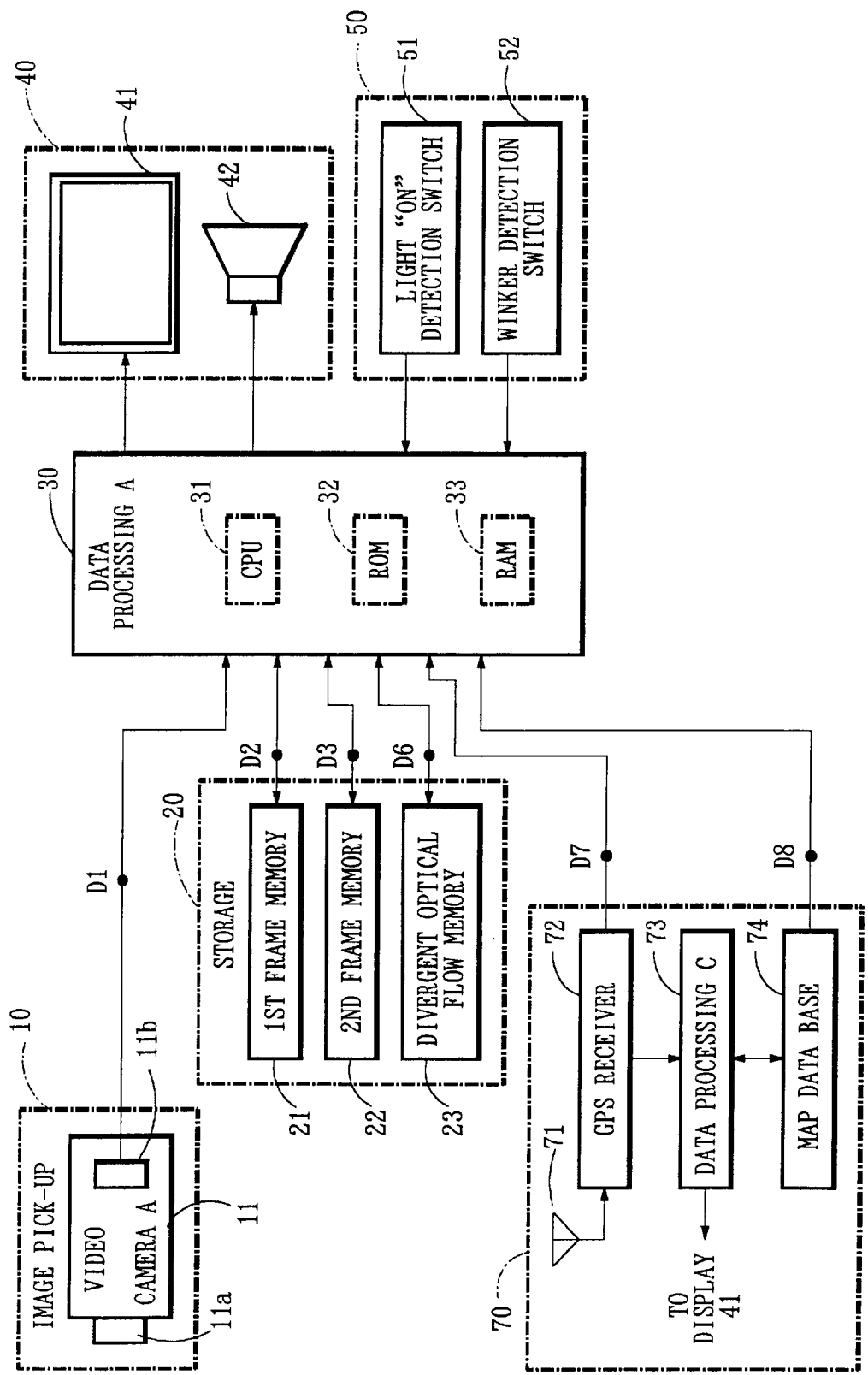

REAR MONITORING SYSTEM

BACKGROUND OF THE INVENTION

1. Field of the Invention

The present invention relates to a rear (inclusive of rear-side or diagonal rear) monitoring system, and more particularly to a rear monitoring system for picking up the road image on the rear of one's own vehicle by an image pick-up means such as a video camera installed on the vehicle such as a motor car, detecting another vehicle approaching from the diagonal-rear direction of one's own running vehicle using the road image picked up and giving a warning to a driver.

2. Description of the Related Art

For example, when a driver of a vehicle running on one-side two lanes of e.g. a speed way intends to change his own vehicle lane, if he changes the lane while he misses another vehicle which catches up with his own vehicle on another lane at a higher speed than his own vehicle from the diagonal-rear direction, there is strong possibility of a serious accident. Therefore, it is desired that the driver surely notices or recognizes other vehicles in the environment.

When another following vehicle on the same lane abruptly approaches his own vehicle from the rear, if the driver of his own vehicle makes abrupt braking, there is possibility of bumping-into-the back.

When another vehicle runs forward on the same lane at a lower speed than that of his own vehicle, if a driver dozes, there is a danger of bumping-into-the back.

A technique for avoiding the danger as described above has been proposed as an environment monitoring system for a vehicle disclosed in JP-A-7-50769. Now referring to FIGS. 11A–11D, an explanation will be given of this environment monitoring system.

FIGS. 11A–11C are views for explaining a change in a rear background image acquired by a video camera 1. FIG. 11A shows a status inclusive of one's own vehicle. FIG. 11B shows an image picked up by a video camera 1 at timing t in an environment of one's own vehicle. FIG. 11C shows an image picked up at timing t+Δt.

Now it is assumed that one's own vehicle is running straight on a flat road. The road sign and building residing in the rear of one's own vehicle in FIG. 11A are observed as images shown in FIG. 11B and 11C at timings t and t+Δt, respectively. Coupling the corresponding points in these two images provides speed vectors as shown in FIG. 11D. These are referred to as "optical flows". Where a following vehicle approaches, the directions of the vectors in the optical flows in FIG. 11D are contrary. Using the optical flows, the conventional environment monitoring system monitors the relationship between one's own vehicle and the following vehicle or another vehicle running on an adjacent lane to detect the other vehicle approaching one's own vehicle, thereby giving a warning to a driver.

In some prior arts, a technique of searching corresponding points using two cameras is adopted. Specifically, an edge point Pa of an object is detected from a luminance difference between the adjacent pixels on the image picked up by a camera. A point Pb of the image picked up by another camera corresponding to the detected edge point is detected. The position of another approaching vehicle is acquired by the pixel coordinates of Pa and Pb. On the basis of the position acquired, the pertinent driver is given a warning of the existence of another vehicle approaching his own vehicle.

Further, there is a conventional technique of detecting the location of a detected other vehicle in such a manner that the road image on a straight speed way having one-side three lanes as shown in FIG. 12 is image-processed to detect the white lines (each of which is a lane-dividing line such as a white line, yellow line, white broken line, etc., and hereinafter referred to as "white line") of the lane on which one's own vehicle is running so that one's own lane is discriminated from the adjacent lane and any other vehicle is detected for each monitoring lane so that it is decided whether the detected vehicle is located on the one's own lane or the other adjacent lane. In some applications, the monitoring area is defined in order to save the processing time for the lane which is not required for monitoring.

Meanwhile, the prior art detects white lines by a technique of image processing. However, it was very difficult to detect the white lines by image-processing the road image with low contrast which is created in the night time and the event of rain. In order to obviate such an inconvenience, it can be proposed to pick up the white lines by a camera while the rear of vehicle is projected with light. However, the glare of light may obstruct the safe running of the following vehicle so that it is dangerous to project light to a far distance. In addition, it takes a relatively long time for processing to detect the white lines. Therefore, even if the road image has a high contrast, the white lines cannot be easily detected.

SUMMARY OF THE INVENTION

An object of the present invention is to provide a rear monitoring system for a vehicle which can easily detect white lines for discriminating one's own lane from an adjacent lane.

In order to attain the above object, in accordance with the present invention, as shown in a basic arrangement view of FIG. 1A, there is provided a diagonal-rear monitoring system for a vehicle for monitoring a relationship between one's own vehicle and another vehicle comprising:

image pick-up means 10 attached to one's own vehicle for picking up a diagonal-rear road behind one's own vehicle to acquire an diagonal-rear road image;

detection means 31a for detecting another vehicle on the basis of the diagonal-rear road image acquired by the image pick-up means;

information acquisition means 31b for acquiring information on a road on which one's own vehicle has run;

white-line estimating means 31c for estimating white lines on the diagonal-rear road image which distinguish one's own lane from both adjacent lanes on the basis of the information acquired by the information acquisition means, wherein using the white lines thus estimated, it is decided whether another detected vehicle is located on one's own lane or the adjacent lanes.

In this configuration, in the nighttime when the white lines cannot be detected from the diagonal-rear road image, the white lines on the diagonal-rear road image can be estimated using the information on the road on which one's own vehicle has run.

Preferably, the information acquisition means comprises:

front image pick-up means 61 attached to one's own vehicle for picking up a front road ahead of one's own vehicle to acquire an diagonal-rear road image; and white-line information acquisition means 62 for successively acquiring information on white lines which distinguish one's own lane from both adjacent lanes on the basis of the front road image acquired by the front image pick-up means; and the white line estimating means estimates white lines on the diagonal-rear road image which distinguish one's own lane from both adjacent lanes on the basis of the information acquired by the white-line information acquisition means.

In this configuration, by only acquiring the front image, the white lines can be estimated.

Preferably, the diagonal-from image pick-up means and the white-line information acquisition means are those originally installed in the system.

In this configuration, it is not necessary to provide the front image pick-up means and white-line information acquisition means separately.

Preferably, the information acquisition means comprises position information acquisition means 31*b*-1 for acquiring vehicle position information indicative of a position coordinate of a vehicle at a prescribed period when the vehicle is running on one's own lane, the position information varying according to a helm angle and running speed of the vehicle, and the white-line estimating means estimates white lines on the diagonal-rear road image which distinguish one's own lane from both adjacent lanes on the basis of the information acquired by the position information acquisition means.

In this configuration, the white lines can be easily estimated by only acquiring the vehicle position information on the basis of the helm angle and running speed.

In accordance with the present invention, as shown in FIG. 1B, there is provided a diagonal-rear monitoring system for a vehicle for monitoring a relationship between one's own vehicle and another vehicle comprising:

image pick-up means 10 attached to one's own vehicle for picking up a diagonal-rear road behind one's own vehicle to acquire an diagonal-rear road image;

detection means 31*a* for detecting another vehicle on the basis of the diagonal-rear road image acquired by the image pick-up means;

map storage means 74 for storing road information inclusive of a road shape;

information acquisition means 72 for acquiring information of a present location of one's own vehicle;

white-line estimating means 31*c* for reading the road information behind the present location of one's own vehicle on the basis of the information acquired by the information acquisition means and estimating white lines on the diagonal-rear road image which distinguish one's own lane from both adjacent lanes on the basis of the road information thus read, wherein using the white lines thus estimated, it is decided whether another detected vehicle is located on one's own lane or the adjacent lanes.

In this configuration, the white lines on the diagonal-rear road image can be easily estimated using the road information.

Preferably, the map storage means and the information acquisition means are those of a GPS navigation device originally installed to inform a driver of a present location of one's own vehicle on a map on a display.

In this configuration, it is not necessary to the map storage means and the information acquisition means separately.

In accordance with the present invention, as shown in FIG. 1B, there is provided a diagonal-rear monitoring system for a vehicle for monitoring a relationship between one's own vehicle and another following vehicle using an optical flow comprising:

image pick-up means 10 attached to one's own vehicle for picking up a diagonal-rear road behind one's own vehicle to acquire diagonal-rear road images at a prescribed period;

optical-flow detection means 31*d* for detecting the optical flow generated from another vehicle on the basis of two successive road images acquired by the image pick-up means;

information acquisition means 72 for acquiring information on a road on which one's own vehicle has run;

white-line estimating means 74 for estimating white lines on the diagonal-rear road image which distinguish one's own lane from both adjacent lanes on the basis of the information acquired by the information acquisition means, wherein using the white lines thus estimated, it is decided whether another vehicle generating the detected optical flow is located on one's own lane or the adjacent lanes.

In this configuration, in the nighttime while the white lines cannot be detected from the diagonal-rear road image, they can be estimated on the basis of the road on which one's own vehicle has run.

In accordance with the present invention, as shown in FIG. 1B, there is provided a diagonal-rear monitoring system for a vehicle for monitoring a relationship between one's own vehicle and another following vehicle using an optical flow comprising:

image pick-up means 10 attached to one's own vehicle for picking up a diagonal-rear road behind one's own vehicle to acquire diagonal-rear road images at a prescribed period;

optical-flow detection means 31*d* for detecting the optical flow generated from another vehicle on the basis of two successive road images acquired by the image pick-up means;

map storage means 74 for storing road information inclusive of a road shape;

information acquisition means 72 for acquiring information of a present location of one's own vehicle;

white-line estimating means 31*c* for reading the road information behind the present location of one's own vehicle on the basis of the information acquired by the information acquisition means and estimating white lines on the diagonal-rear road image which distinguish one's own lane from both adjacent lanes on the basis of the road information thus read, wherein using the white lines thus estimated, it is decided whether another vehicle generating the detected optical flow is located on one's own lane or the adjacent lanes.

In this configuration, since the white lines can be estimated on the basis of the road information, the white lines on the diagonal-rear road image can be easily estimated through acquisition of the road image.

In accordance with the present invention, as shown in FIG. 1C, there is provided a diagonal-rear monitoring system for a vehicle for monitoring a relationship between one's own vehicle and another vehicle comprising:

image pick-up means 10 attached to one's own vehicle for picking up a diagonal-rear road behind one's own vehicle to acquire an diagonal-rear road image;

detection means 31*a* for detecting another vehicle on the basis of the diagonal-rear road image acquired by the image pick-up means;

white-line retrieval region setting means 31*e* for setting a retrieval region within which white lines for distinguishing one's own lane from both adjacent lanes are to be retrieved on the diagonal-rear road image picked up by the image pick-up means; and white-line detection means 31f for retrieving the retrieval region to detect the white lines, wherein using the white lines thus detected, it is decided whether another detected vehicle is located on one's own lane or the adjacent lanes.

Preferably, the retrieval region is set using white-line information acquired on the basis of a front image pick-up in a front monitoring device originally.

In this configuration, the white lines can be detected through the retrieval of only the retrieval region set by the the retrieval region setting means 31e.

The above and other objects and features of the present invention will be more apparent from the following description taken in conjunction with the accompanying drawings.

BRIEF DESCRIPTION OF THE DRAWINGS

FIG. 10 is a block diagram of the second embodiment of the rear monitoring system according to the present invention;

DESCRIPTION OF THE PREFERRED EMBODIMENTS

Figure 1A:
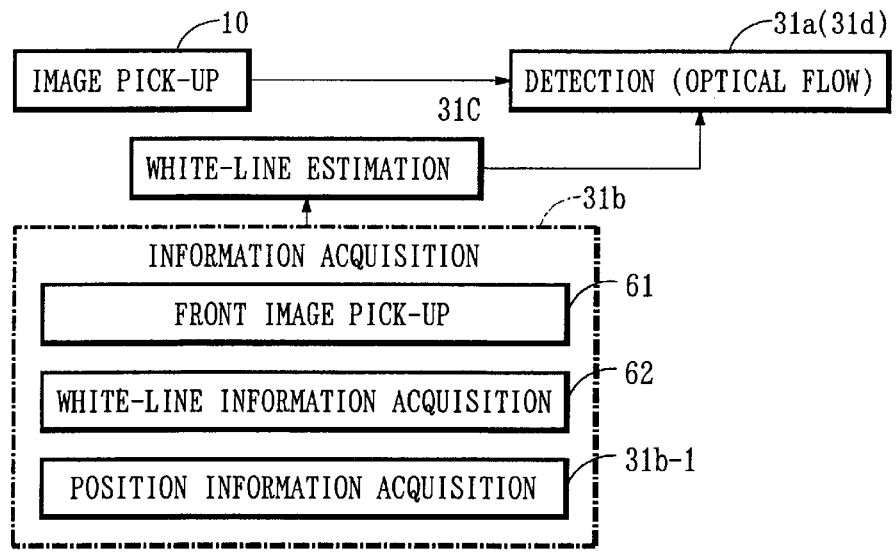
FIGS. 1A–1C are basic diagrams of a rear monitoring system for a vehicle according to the present invention.
Figure 1B:
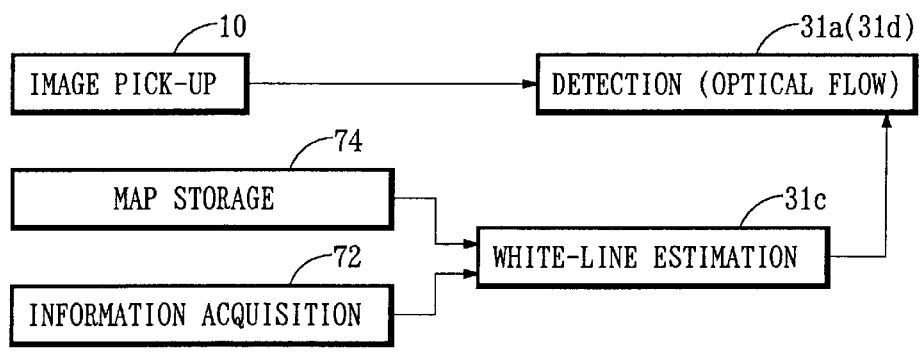
Figure 1C:
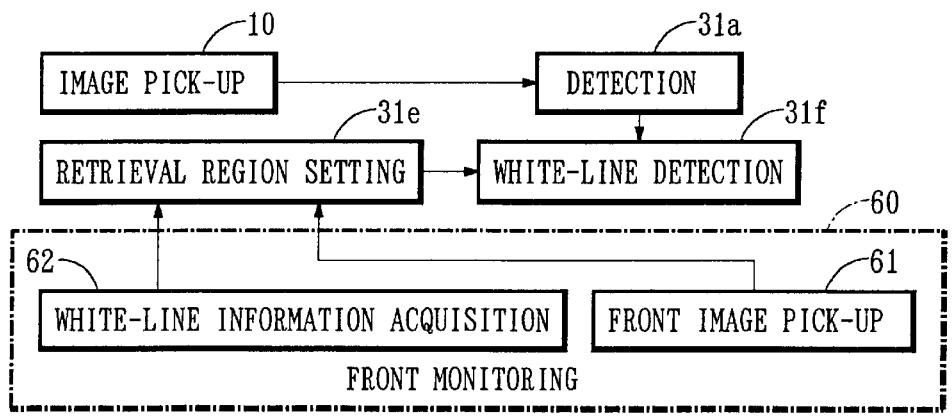

Hereinafter, referring to the drawings, an explanation will be given of several embodiments of the rear monitoring system according to the present invention.

Embodiment 1

Figure 2:
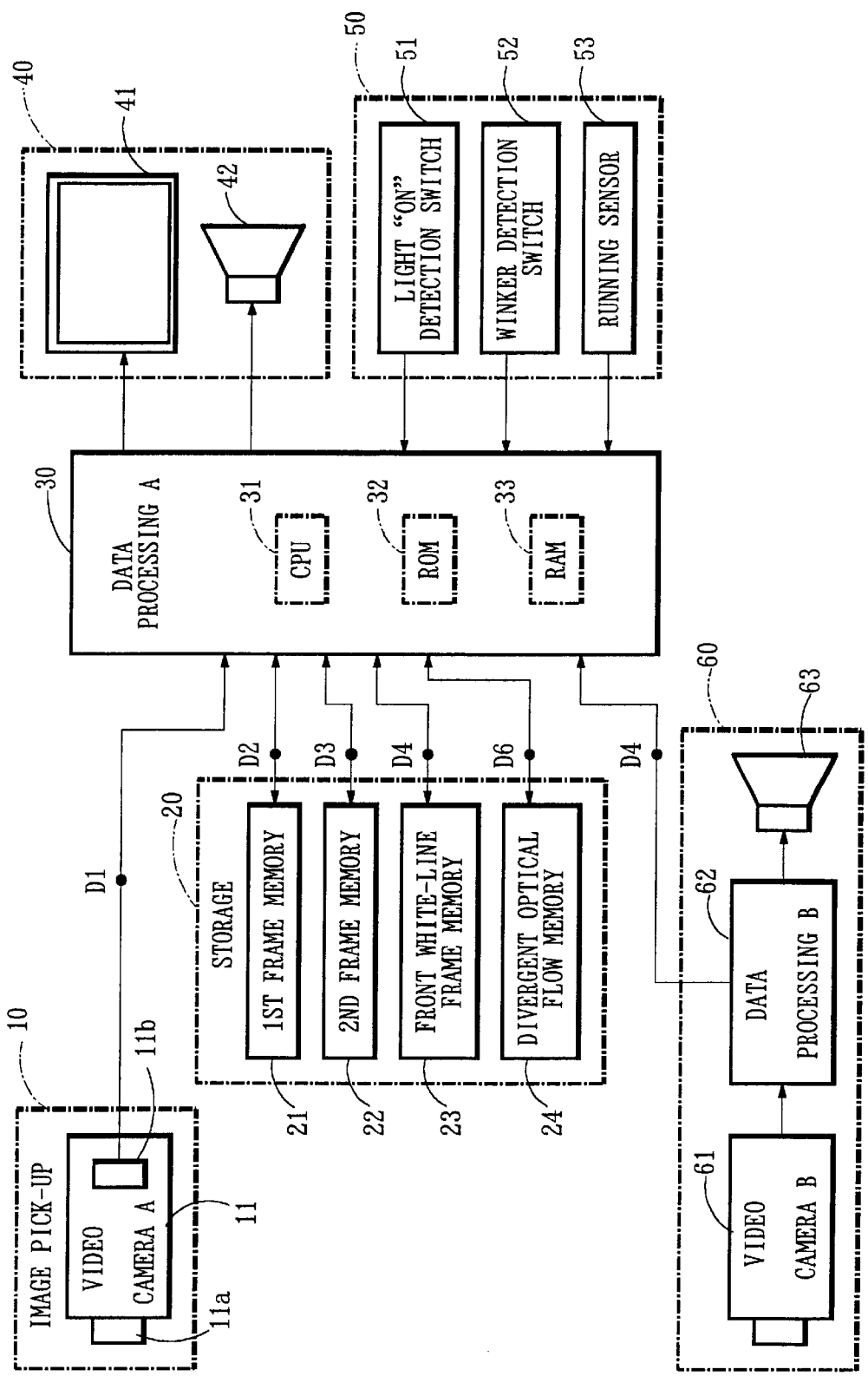
FIG. 2 is a block diagram of the first embodiment of the rear monitoring system according to the present invention.

FIG. 2 shows an embodiment of a rear monitoring system for a vehicle according to the present invention. In FIG. 2, reference numeral 10 denotes an image pick-up section serving as an image pick-up means. Reference numeral 20 denotes a storage section for storing image data and others. Reference numeral 30 denotes a data processing section A for implementing image processing and monitoring a relationship with other vehicles on the basis of the image information from the image pick-up section 10. Reference numeral 40 denotes a warning section for giving a warning. Reference numeral 50 denotes a signal input section for receiving a signal indicative of the operation information when the running direction of one's own vehicle is changed.

The image pick-up section 10, which may be a video camera, includes a lens 11a and image plane 11b. The video camera A11 is attached to the upper or rear side of the trunk portion on the rear side of a vehicle so that it is oriented rearward.

The video camera A11 is configured to pick up the image of the road on the rear of one's own vehicle. The video camera A11 supplies the data D1 of the image thus acquired to a data processing section A30.

The storage section 20 includes a first and a second frame memory 21 and 22, a front white-line frame memory 21 and a divergent optical flow memory 24. The first and the second frame memory 21 and 22 temporarily store, as pixel data D2 and D3, the pixels in a m- by n-matrix (e.g. 512×512 pixels and with the luminance in 0–255 tones) converted from the diagonal-rear road image data D1 imaged on the image plane 11b of the video camera A11, and supplies them to the data processing section A30.

These first and the second frame memory 21 successively store the m×n pixel data D2 and D3 converted from the diagonal-rear road image picked up at an established period Δt in such a manner that it is stored in the first frame memory 21 at timing t, in the second frame memory 22 at timing t+Δt, . . .

The diagonal rear white-line frame memory 23 is composed of a first and a second diagonal-rear frame memory (not shown). The diagonal rear white-line frame memory 23 temporarily stores the white-line data D4 of the front road image for discriminating one's own lane from the adjacent lane at a predetermined period Δt and supplies it to the data processing section A30. The white-line data D4 are acquired from the video camera B61 attached to the front of one's own vehicle and installed in a front monitoring device 60.

The front monitoring device serves as a collision preventing device. The front monitoring device includes a video camera B61 serving as the front image pick-up means, a data processing unit B62 for processing the data supplied from the video camera and a speaker 63 for giving a warning. Specifically, in the collision-preventing device, the data processing unit B62 detects the white line to discriminate the one's own lane from the adjacent lane in the front road image picked up by the video camera B61, and decides the danger degree of rear-end collision of the one's own vehicle with another diagonal-front vehicle which is running on the one's own lane. On the basis of the result of decision, the speaker B63 gives a warning. Incidentally, the above white-line data D4 is taken from the data processing section B62.

In this embodiment, the front monitoring device was used as the collision preventing device 60. However, it may be used for an adaptive cruise control (ACC). The ACC is performed in such a way that the one's own vehicle can follow another vehicle, which runs ahead of the one's own vehicle at a lower speed than a prescribed speed, while it runs at maintaining the distance between both vehicles. In this case, such a vehicle running at the low speed can be detected by detecting the white line to discriminate the one's own lane from the adjacent lane on the front (inclusive of front-side or diagonal front) image picked up by the video camera B61 and the vehicle running on only the one's own lane on the basis of the thus detected white line.

Since the video camera B61 installed in the front monitoring device can be used for the above purpose without providing any other separate video camera, the production cost can be reduced.

The data processing A30 includes a CPU 31 operating along a control program, a ROM 32 for storing the control program for the CPU 31 and an RAM for temporarily storing the data required for the operation by the CPU 31.

The warning section 40 includes a display 41 and a speaker 42. The display 41 which may be an LCD displays the diagonal-rear road image picked up by the video camera A11, or displays a message when it is decided by the data processing unit A that there is danger of contact with another vehicle, thereby visually informing the driver of the danger. The speaker 42 produces sound such as an audio guidance or an audible alert. When it is decided by the data processing section A30 that there is danger of collision or contact with another vehicle, the danger is informed the driver by sound.

The signal input section 50 includes a light-on detecting switch 51, a winker (turn signal) detecting switch 52 and a running sensor 53. The light-on detecting switch 51 serves to detect the "on" of a head light by a driver. The winker detecting switch 52 serves to detect the operation state and its operation direction of a winker mechanism by the driver, i.e. turn-around instruction information from a winker mechanism operated when the driver turns the vehicle around toward the right or left side. The running sensor 53 serves to detect the running distance of a vehicle.

Referring to the flowchart of FIG. 3, an explanation will be given of the control operation by the data processing section A30.

First, in step SP110, the processing of acquisition of white-line information is performed by the CPU 31. In this processing, the white-line data D4 of the front road image detected by the data processing section B62 is acquired to estimate the white line of a diagonal-rear road image. The white-line data of the front road image thus acquired is stored in the diagonal-front white-line frame memory 23.

Figure 4:
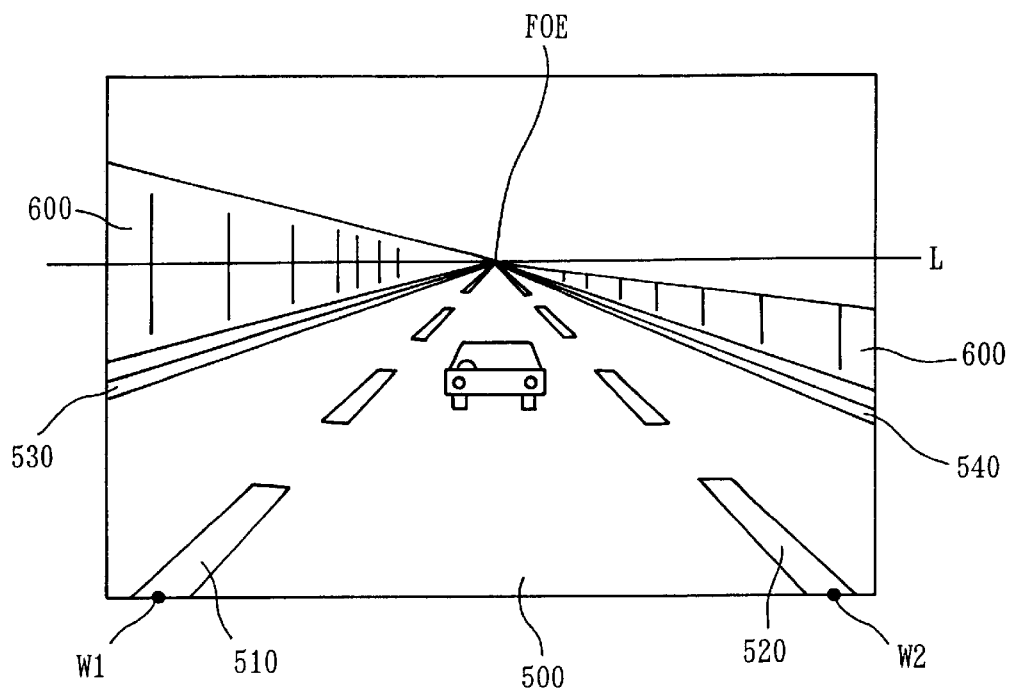
FIG. 4 is a view showing an example of the road image picked up by a video camera in the rear monitoring system according to the present invention.

In step SP120, the processing of acquiring the diagonal-rear image is performed. In this processing, the rear road image as shown in FIG. 4 is acquired.

This rear road image is an image viewed from one's own vehicle which is running on a vehicle-dedicated road such as a speed way. Namely, it is the image directly picked up by the video camera A11 attached to the rear of the vehicle so that it is oriented rearward. As seen from FIG. 4, the image includes a road 500, inner white lines 510, 520 and outer white lines 530, 540, and side walls 600. The inner white lines 510, 520 are broken lines which are drawn on the road to discriminate one's own vehicle from adjacent lanes, and permit a lane change to be made. The outer white lines 530, 540 are continuous solid lines which are drawn on the road to define side roads and prohibit the lane change. The image of side walls 600 formed upright on both sides of the road 500 disappears at the center position in a horizontal direction and a position of ⅓ from above in a vertical direction. The disappearing point is referred to as "FOE".

The data D1 of the rear-diagonal road image thus acquired are converted into the pixel data D2 which is an image in a matrix with m-rows and n-columns. The image data D1 are stored in the first frame memory 21 of the storage section 20.

The FOE line L indicative of the position of the FOE in the vertical direction depends on the view angle of the video camera A11 attached to the rear side of one's own vehicle so as to be oriented rearward, lens aberration, installing parameters (height and elevation angle), etc. For example, it is located at a rear position of 100 meter. The explanation will be made assuming that the FOE line L is located at the rear position of 100 meter.

In step SP130, the output from the light-on detecting switch 51 is read to decide whether or not the head light is "ON" or not. If YES, it is decided that even if the rear road image is processed, the white line cannot be recognized because it is now in the nighttime. The processing proceeds to step SP140 in which white-line estimation is performed by the CPU 31.

Figure 5A:
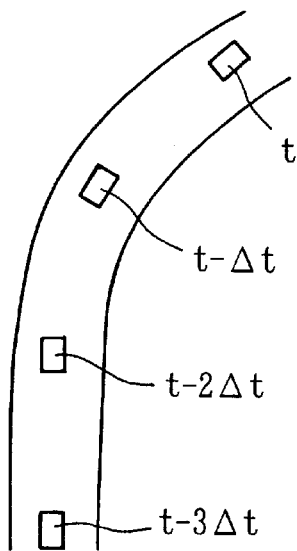
FIGS. 5A–5C are views for explaining a concrete example of white-line estimating processing.
Figure 5B:
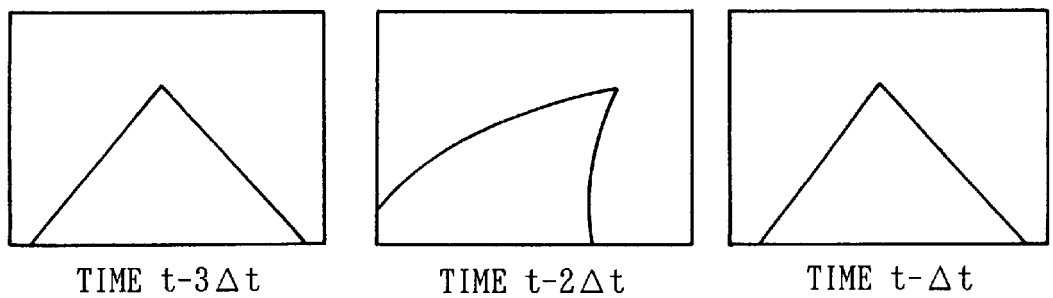

Referring to FIGS. 5A and 5B, an explanation will be given of an example of the processing of white-line estimation. Now it is assumed that the vehicle runs along the line as shown in FIG. 5A for every period Δt. Now, the white-line data D4 detected from the front road image, as shown in FIG. 5B, have been stored in the diagonal-front white-line frame memory 23.

Figure 5C:
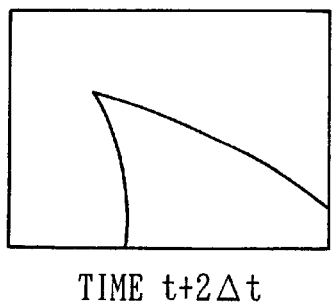

First, in order to estimate the white lines of the rear image picked up at the vehicle position at timing t, the white-line data D4 100 meter ahead of the position of one's own vehicle at the timing, which is a position of the FOE line L, is acquired from the diagonal-front white-line memory 23. For example, if the position of about 100 meter ahead corresponds to the timing t−2Δt, two frames ago, as a result of the detection result of the running sensor 53, the white line data D4 at the timing t−2Δt is acquired. On the basis of the white-line data D4 at timing t−2Δt, the white lines will be estimated as shown in FIG. 5c.

Figure 6A:
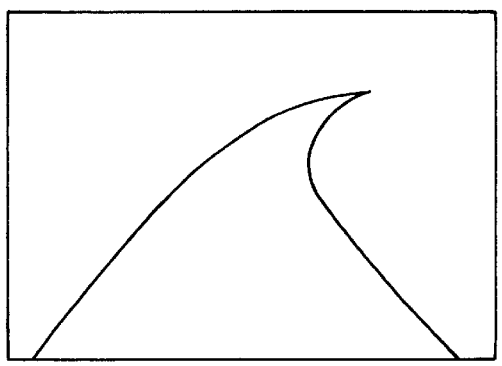
FIGS. 6A and 6B are views for explaining the manner of estimation of white lines.
Figure 6B:
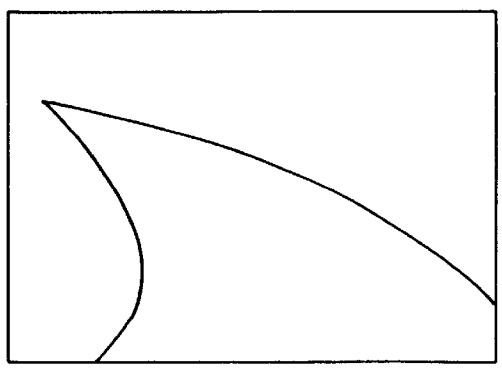

The estimation of the white lines will be made as follows. For example, it is assumed that in the white line data D4 of the front road picked up 100 meter ahead of one's own vehicle, as shown in FIG. 6A, the line at a relatively near position is straight whereas that at a far position is curved. In this case, in the estimated rear road image, as shown in FIG. 6B, the line at the relatively near position is curved, whereas that at the far position is straight. It can be also estimated that the orientation of the curve of the estimated rear road image is reverse to that of the front road image.

Thus, by estimating the white lines on the basis of the white-line data D4 in the front image picked up by the video camera B61, the white lines can be easily detected in the nighttime when the white lines cannot be detected from the rear road image.

Further, since the white data D4 detected by the front monitoring device 60 is used for estimation, the white lines can be easily detected with no image processing. After the white lines are estimated, the processing proceeds to step SP150.

Figure 7:
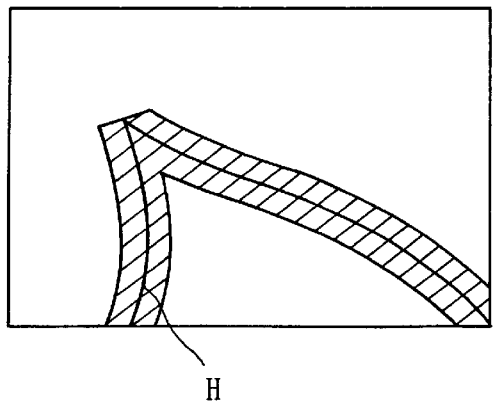
FIG. 7 is a view for explaining retrieval-region setting processing.

In step SP130, if "NO" (the headlight is "off"), it is decided that the white lines can be detected from the rear road image since it is now in the daytime, and hence the processing proceeds to step SP160. In step SP160, the processing of setting a retrieval area is performed by the CPU 31. Referring to FIG. 7, the processing of setting a retrieval area will be explained below.

By the same processing as the white-line estimating processing in step SP140, a white line H of the rear road image is estimated. On the basis of the white line H, an area having a prescribed width and shaded as seen from FIG. 7C is set as a retrieval area. In step SP170, the processing of detecting a white line is performed by the CPU 31. In this white-line detecting processing, the white line is detected for only the retrieval area. Therefore, the quantity of the image processing for detection of the white line is reduced so that the white line can be easily detected in the daytime. Thereafter, the processing proceeds to step SP150 in FIG. 3.

In step SP150, the processing of setting a monitoring region is performed. In this monitored region setting processing, a monitoring region for one's own lane is set inside region encircled by the white line estimated or detected in step SP140 or 170, whereas that for the adjacent lane is set in the region outside the white line and particularly encircled by the FOE line L. Thereafter, the processing proceeds to step SP180. In step SP180, the processing of detecting an optical flow is performed by the CPU 31.

The processing of detecting the optical flow is performed for each of the monitoring regions set in step SP150. Where the monitoring region is set in both adjacent lanes on both sides of one's own lane, it is picked up later than the road image stored in the first frame memory 21 by a prescribed time Δt. The same monitoring region is set for the road image stored in the second frame memory 22. The moving direction and moving distance between each of the points constituting the road image at timing t and the corresponding points at timing t+Δt can be detected as the optical flow.

In step SP190, the processing of computing the degree of danger will be made. In this step, the magnitude (or length) of the optical flow in a diverging direction from the FOE is weighted so that it takes a numerical form. Incidentally, in this processing, with a threshold value set in several levels, the level of danger may be computed.

In step SP200, on the basis of the degree of danger thus computed, if it exceeds the threshold value, decision of being danger is made. Otherwise, if the level of danger exceeds a prescribed value, decision of being dangerous is made.

If the decision of being dangerous is made, in step SP210, the processing of warning is executed. If the decision of being not dangerous, the processing is ended. Subsequently, the processing from step SP110 will be started again.

In the processing of warning in step SP210, an audio signal is sent to the speaker 42 in the warning section 40. An audio guidance or audible alert is produced so that the attention of the driver is attracted. In addition, a message is displayed on the display 41 so that the danger is visually informed the driver. Upon completion of the warning processing, the processing from step SP110 is started again.

In the above embodiment, although the processing of estimating the white line was executed in the nighttime, it can be executed in the daytime to estimate the white line.

In the above embodiment, the information on the road on which one's own vehicle has run is acquired by acquiring the white line data D4 on the front road image (position information acquiring means 61). However, it maybe acquired from the position coordinate which can be computed on the basis of the helm angle (obtained by a helm angel sensor) and running speed obtained by the running sensor 53 (position coordinate acquiring means 31b-1).

Figure 8:
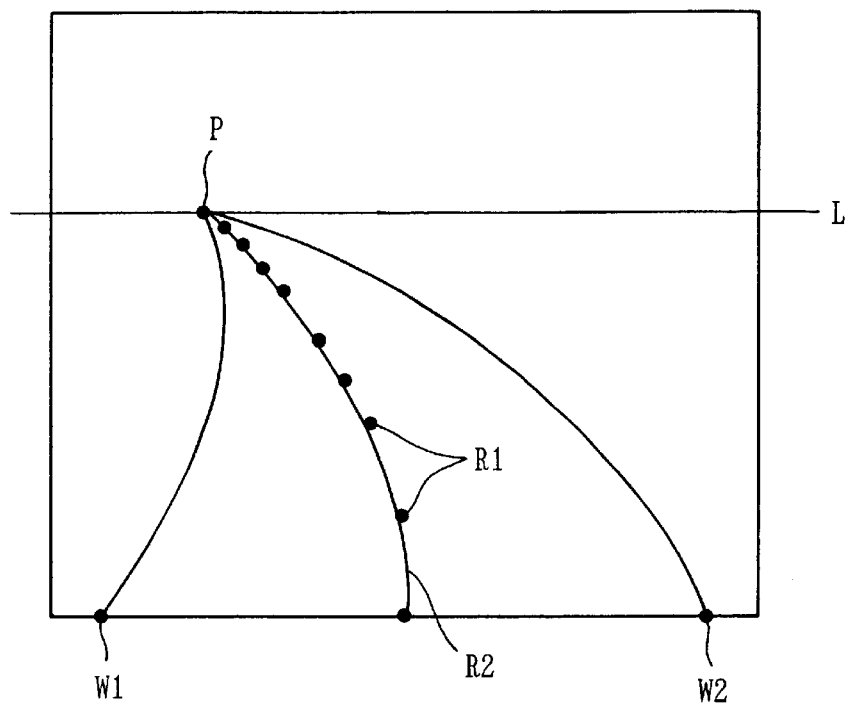
FIG. 8 is a view of the white line estimated by a running locus or road shape.

If the running locus R2 composed of points R1 as shown in FIG. 8 is plotted as a result of acquisition of the position information, two white line positions W1 and W2 intersecting the outer edge of the rear road image are connected to the point P which is located at 100 meter behind along the locus as two curves. These curves are estimated as white lines. The white line positions W1 and W2, which are located at positions very near from the vehicle, can be obtained from the rear road image in such a manner that light is projected downward in a degree of glare not sensed by the driver of the following vehicle.

The white line positions W1 and W2 move in accordance with the helm angle. Therefore, they may be detected by the image processing for an minimum image processing region which is defined on the outer periphery of the rear road image corresponding to the range of the white line moving according to the helm angle. The image processing is made while attention is paid to the fact that luminance is stronger at the two positions intersecting the outer edge of the rear road image than the other positions. Further, if the white line positions W1 and W2 according to the helm angle, which can be sensed by the helm angle sensor attached to the rear monitoring device, are previously stored, the white line positions W1 and W2 according to the helm angle.

As described above, by estimating the white lines on the rear road image which distinguish one's own lane from both adjacent lanes on the basis of the vehicle position information indicative of the locating coordinate of the vehicle changing according to the helm angle and running speed of the vehicle, the white lines on the rear road image can be easily estimated without making the image processing by acquisition of the helm angle and running speed regardless of the daytime and nighttime. Even if the white lines cannot be detected from the front road image, they can be estimated.

Embodiment 2

Referring to the drawings, an explanation will be given of a rear monitoring device according to the second embodiment of the present invention. FIG. 10 is a block diagram of the second embodiment of the rear monitoring device. In FIG. 10, like reference numerals refer to like elements in the first embodiment shown in FIG. 2.

In FIG. 10, a data processing A30 receives present position data D7 from a GPS receiver 72 which is an information acquiring means through a GPS antenna 71 and map data D8 from a map database 74 which is map storage means.

The GPS antenna 71, GPS receiver 72 and map data base 74 are included in a GPS navigation apparatus 70 in which the map data D8 corresponding to the present position data D7 are read out from the map data base 74 stored in a large-capacity memory such as a CD-ROM by the data processing section C73 and displayed on the display 41. Use of the GPS navigation apparatus intends to reduce the production cost.

Figure 3:
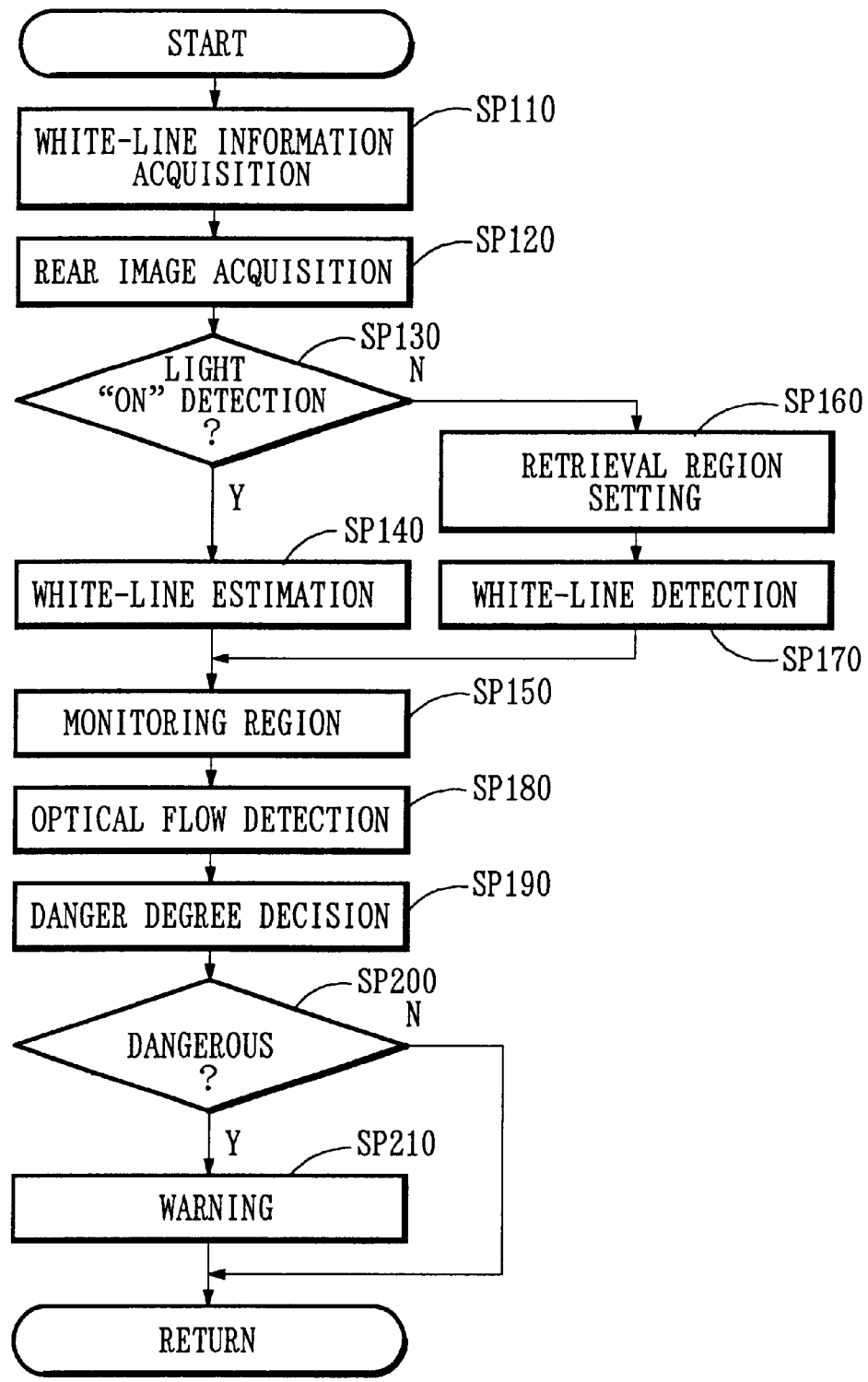
FIG. 3 is a flowchart showing the operation of the rear monitoring system according to the present invention.
Figure 9:
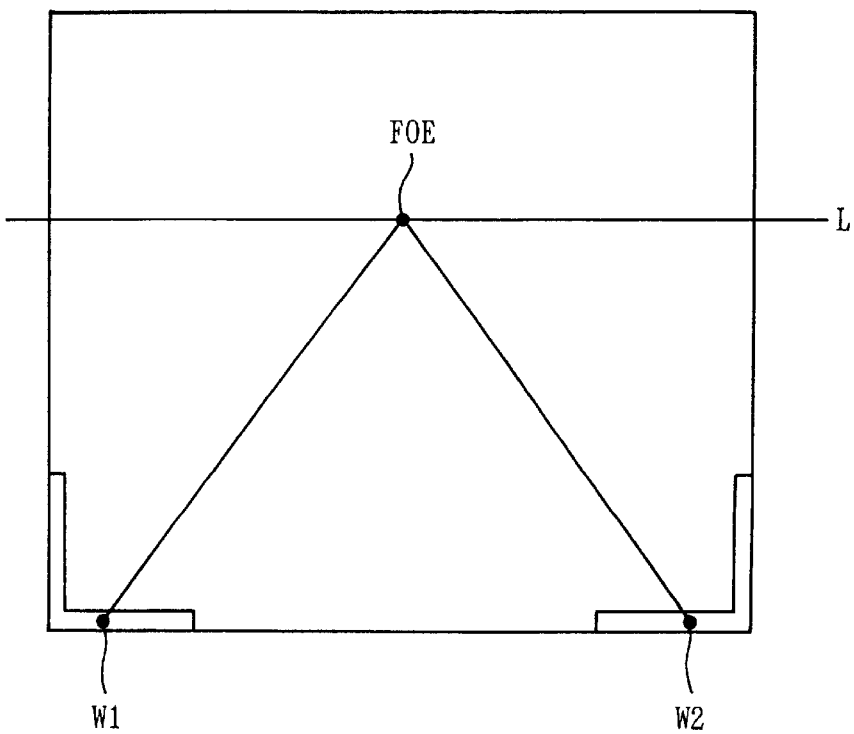
FIG. 9 is a view showing an example of the manner of determining the position of white lines.
Figure 11A:
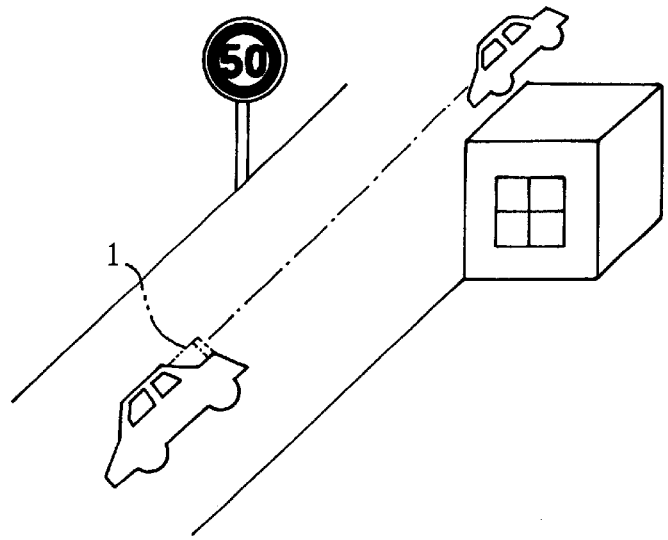
FIGS. 11A–11D is a view for explaining changes in the road image on the rear picked up by a video camera 1.
Figure 11B:
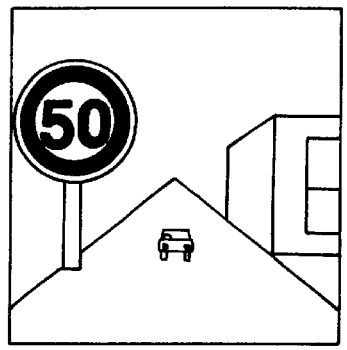
Figure 11C:
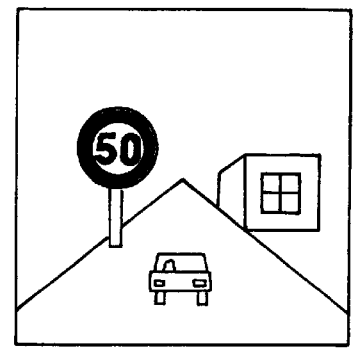
Figure 11D:
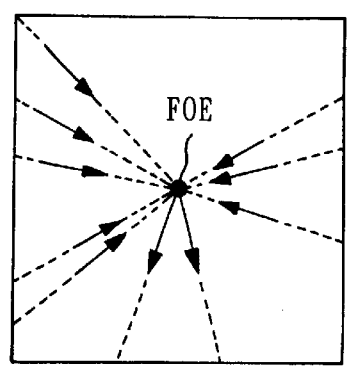
Figure 12:
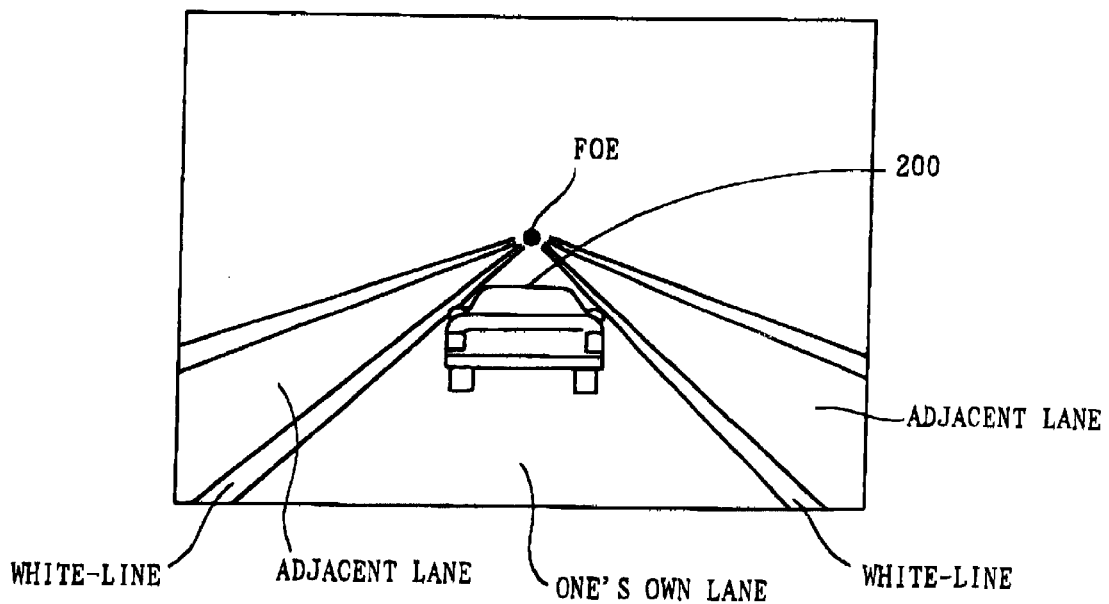
FIG. 12 is a conceptual view of the road image of a speed way having one-side three lanes.

Referring to FIG. 3, an explanation will be given of the operation of the rear monitoring system for a vehicle, i.e. operation of the CPU 30 in the data processing section 30. The same steps as those in the first embodiment will not be explained in detail. In the second embodiment, the operation in step SP110 is not performed, and the subsequent SP120–SP130 are performed in the same manner as in the first embodiment. In step SP130, if the light is "ON", it is decided that the white line cannot be detected from the rear road image, and the processing of white line estimation in step SP140 is performed. Referring to FIG. 9, an example of the white line estimation in step SP140 will be explained.

First, the present position data D7 received by the GPS receiver are read out. The map data D8 corresponding to the present position data D7 are read out from the map data base 64. Next, the image of a road shape 100-meter behind from the present position is acquired on the basis of the read present position data D7 and map data D8. Assuming that road shape R2 as shown in FIG. 8 has been plotted, two white line positions W1 and W2 intersecting the outer edge of the rear road image are connected to the point P which is located at 100 meter behind along the locus as two curves. These curves are estimated as white lines.

In step 130, if the light is "OFF", it is decided that the white lines can be detected from the rear image. Subsequently, in the processing of detection of the white lines in step SP160, the white lines constituting both ends of the lane on which one's own vehicle runs are detected from the rear-diagonal road map acquired by the video camera A11. Thereafter, the processing in each of steps SP150–SP210 will be executed.

What is claimed is:

1. A rear monitoring system for a vehicle for monitoring a relationship between one's own vehicle and another vehicle comprising:

image pick-up means attached to said one's own vehicle for picking up a rear road behind said one's own vehicle to acquire a rear road image;

detection means for detecting said another vehicle on the basis of the rear road image acquired by the image pick-up means;

information acquisition means for acquiring information on a road on which said one's own vehicle has run;

white-line estimating means for estimating white lines on the rear road image which distinguish one's own lane from both adjacent lanes on the basis of the information acquired by said information acquisition means, wherein using the white lines thus estimated, it is decided whether said another detected vehicle is located on said one's own lane or the adjacent lanes.

2. A rear monitoring system according to claim 1, wherein said information acquisition means comprises:

front image pick-up means attached to said one's own vehicle for picking up a front road ahead of said one's own vehicle to acquire said rear road image; and white-line information acquisition means for successively acquiring information on white lines which distinguish said one's own lane from said both adjacent lanes on the basis of the front road image acquired by said front image pick-up means; and said white line estimating means estimates white lines on the rear road image which distinguish said one's own lane from said both adjacent lanes on the basis of the information acquired by said white-line information acquisition mean.

3. A rear monitoring system according to claim 2, wherein said front image pick-up means and said white-line information acquisition means are those originally installed in the system.

4. A rear monitoring system according to claim 1, wherein said information acquisition means comprises position information acquisition means for acquiring vehicle position information indicative of a position coordinate of a vehicle at a prescribed period when the vehicle is running on said one's own lane, said position information varying according to a helm angle and running speed of the vehicle, and said white-line estimating means estimates white lines on the rear road image which distinguish said one's own lane from said both adjacent lanes on the basis of the information acquired by said position information acquisition means.

5. A rear monitoring system according to claim 1, wherein said information acquisition means and white line estimating means are replaced by white-line retrieval region setting means for setting a retrieval region within which white lines for distinguishing said one's own lane from said both adjacent lanes are to be retrieved on the rear road image picked up by said image pick-up means; and white-line detection means for retrieving said retrieval region to detect the white lines, wherein using the white lines thus detected, it is decided whether another detected vehicle is located on said one's own lane or the adjacent lanes.

6. A rear monitoring system for a vehicle according to claim 5, wherein said retrieval region is set using white-line information acquired on the basis of a front road image taken by a front image pick-up means originally installed in said rear monitoring device installed originally.

7. A rear monitoring system for a vehicle for monitoring a relationship between one's own vehicle and another vehicle comprising:

image pick-up means attached to said one's own vehicle for picking up a rear road behind said one's own vehicle to acquire a rear road image;

detection means for detecting said another vehicle on the basis of the rear road image acquired by the image pick-up means;

map storage means for storing road information inclusive of a road shape;

information acquisition means for acquiring information of a present location of said one's own vehicle;

white-line estimating means for reading the road information behind the present location of said one's own vehicle acquired by said information acquisition means and estimating white lines on the rear road image which distinguish one's own lane from both adjacent lanes on the basis of the road information thus read, wherein using the white lines thus estimated, it is decided whether another detected vehicle is located on said one's own lane or the adjacent lanes.

8. A rear monitoring system for a vehicle according to claim 7, wherein said map storage means and said information acquisition means are those of a GPS navigation device originally installed to inform a driver of the present location of said one's own vehicle on a map on a display.

9. A rear monitoring system for a vehicle for monitoring a relationship between one's own vehicle and another following vehicle using an optical displacement comprising:

image pick-up means attached to said one's own vehicle for picking up a rear road behind said one's own vehicle to acquire rear road images at a prescribed period;

optical-displacement detection means for detecting optical displacements generated from another vehicle on the basis of two successive road images acquired by the image pick-up means;

information acquisition means for acquiring information on a road on which said one's own vehicle has run;

white-line estimating means for estimating white lines on the rear road images which distinguish one's own lane from both adjacent lanes on the basis of the information acquired by said information acquisition means, wherein using the white lines thus estimated, it is decided whether said another vehicle generating the detected optical displacements is located on said one's own lane or the adjacent lanes.

10. A rear monitoring system for a vehicle for monitoring a relationship between one's own vehicle and another following vehicle using an optical displacement comprising:

image pick-up means attached to said one's own vehicle for picking up a rear road behind said one's own vehicle to acquire rear road images at a prescribed period;

optical-displacement detection means for detecting the optical displacements generated from another vehicle on the basis of two successive road images acquired by the image pick-up means;

map storage means for storing road information inclusive of a road shape;

information acquisition means for acquiring information of a present location of said one's own vehicle, white-line estimating means for reading the road information behind the present location of said one's own vehicle on the basis of the information acquired by said information acquisition means and estimating white lines on the rear road images which distinguish one's own lane from both adjacent lanes on the basis of the road information thus read, wherein using the white lines thus estimated, it is decided whether said another vehicle generating the detected optical displacements is located on said one's own lane or the adjacent lanes.

* * * * *